(12) United States Patent
Jaynes

(10) Patent No.: US 7,037,556 B2
(45) Date of Patent: May 2, 2006

(54) PROCESS AND APPARATUS FOR PREPARATION OF A NO-JAM VENDING MACHINE PLASTIC CARD

(75) Inventor: Dennis E. Jaynes, Huntley, IL (US)

(73) Assignee: Jet Lithocolor Inc., Downers Grove, IL (US)

( * ) Notice: Subject to any disclaimer, the term of this patent is extended or adjusted under 35 U.S.C. 154(b) by 169 days.

(21) Appl. No.: 10/797,534

(22) Filed: Mar. 10, 2004

(65) Prior Publication Data
US 2005/0202165 A1 Sep. 15, 2005

(51) Int. Cl.
B05D 3/10 (2006.01)
B05C 19/00 (2006.01)
B05C 11/00 (2006.01)

(52) U.S. Cl. .................. 427/195; 427/10; 118/713; 118/309; 73/159

(58) Field of Classification Search ............. 118/308, 118/309, 696, 712, 713; 427/8–10, 195; 73/9, 159, 488
See application file for complete search history.

(56) References Cited

U.S. PATENT DOCUMENTS

| 2,729,194 A * | 1/1956 | Jones .................. 118/308 |
| 4,873,937 A | 10/1989 | Binder et al. |
| 5,490,410 A * | 2/1996 | Markstrom .................. 73/9 |
| 5,654,050 A | 8/1997 | Whalen-Shaw |
| 6,199,757 B1 | 3/2001 | Kubert |
| 6,231,042 B1 | 5/2001 | Ito et al. |
| 6,267,370 B1 | 7/2001 | Ito et al. |
| 6,425,344 B1 | 7/2002 | Strahm |
| 6,497,371 B1 | 12/2002 | Kayanakis |
| 6,510,788 B1 | 1/2003 | Norheim |
| 6,645,298 B1 * | 11/2003 | Herren et al. .................. 118/313 |

FOREIGN PATENT DOCUMENTS

JP 2000-310591 * 11/2000

OTHER PUBLICATIONS

English translated Abstract of JP2000-310591.*

* cited by examiner

*Primary Examiner*—Chris Fiorilla
*Assistant Examiner*—Yewebdar Tadesse
(74) *Attorney, Agent, or Firm*—Leon I. Edelson; William C. Clarke; Levenfeld Pearlstein

(57) ABSTRACT

A process and apparatus is disclosed for preparation of a no-jam vending machine card wherein the card is treated with a suitably adhering powder to have a residual powder layer on the card to reduce generation of an electrical static charge upon each card as the card is dispensed by the vending machine. The process comprises applying a suitable dusting powder and testing the dusted card for the necessary residual powder layer. The apparatus comprises a powder dusting device and a card powder layer testing device.

11 Claims, 3 Drawing Sheets

PROCESS AND APPARATUS FOR PREPARATION OF A NO-JAM VENDING MACHINE PLASTIC CARD

FIELD OF THE INVENTION

The present invention relates to a process and apparatus for preparation of a no-jam vending machine card.

The present invention relates to a process and apparatus for the process for treating and testing a vending machine card so that the card after treatment can be stacked and dispensed from a vending machine without stopping in the card's exit from the vending machine or jamming the vending machine because of the card's failure to exit the vending machine. The present invention relates to a method for preparing a vending machine card such as a pre-paid telephone card wherein a card dispensing device will dispense a card one-by-one from a plurality of cards stacked and housed within the card dispensing device.

The present invention accordingly relates to a process and apparatus for the process for preparing a no-jam vending machine card for passage through the card-dispensing device of the vending machine without jamming the machine and to the apparatus for treating and testing the vending machine card to provide a protective coating on the card which reduces the generation of a static charge upon the card as each card is processed and ejected by the card-dispensing device.

The present invention relates to a process and apparatus to prepare credit cards or debit cards which can be dispensed from a vending machine without jamming the card dispensing device in the vending machine, to the process for coating the card to reduce generation of a static charge upon the card, to the apparatus for coating the card with a residual coating which reduces generation of a static charge upon each card, and to an apparatus for testing the efficacy of the residual coating to reduce generation of a static charge upon the card.

BACKGROUND OF THE INVENTION

Plastic cards such as pre-paid telephone cards and similar prepaid debit cards are vended from vending machines away from service facilities for the vending machines. It is therefore essential that the plastic cards be immediately available from the vending machine without hindrance or obstruction caused by static electricity building on the plastic material face of the card. Building of the static electricity upon the face of the card can result in failure of the vending machine to dispense the cards one by one, thus requiring service intervention of the vending machine to continue operation of the machine.

Plastic cards vended by a vending machine slide down a metal chute from a source sleeve to the discharge outlet. The slide of the card down the metal chute can build up a static charge on the plastic card to stop the card from sliding down the chute and cause the cards to jam-up in the chute every two or three cards.

The generation of static electricity upon non-conductive surfaces of material such as plastics and paper is well-known. The build-up can cause articles made of such materials to adhere together on their surfaces or to other materials. A cause of such generation of static electricity can be friction encountered by the card sliding down the card delivery chute of the vending machine. Numerous methods and devices can be applied to dissipate the static electric charge. However, application of an anti-friction substance to prevent or reduce friction and thus prevent or reduce buildup of static electricity upon the plastic card as the card is processed by the vending machine can negate the need to provide conventional devices to dissipate the static electrical charges that develop upon the plastic cards.

The application of an anti-friction substance to prevent static electricity buildup requires that each individual card receive an application of an anti-friction substance in sufficient measure to prevent static electricity buildup by and on each individual card. Each individual card is therefore required to be treated separately to receive an individual application of an anti-friction substance. Treatment of individual cards upon a production line for such cards for use in vending machines requires that the cards be treated in a continuous operation and that each card receive a controlled amount of an anti-friction substance upon the surface of each card.

The problems inherent in placing a controlled amount of an anti-friction substance upon the surface of each individual card are problems of control and measurement of the anti-friction material as the anti-friction material is applied to the surfaces of the plastic cards. The anti-friction material is typically applied as a powder.

The anti-friction material can be subject to problems of application to the cards because of the ambient environment of temperature and humidity. The combination of temperature and humidity conditions can cause this anti-friction material as a powder to cake and from a lumpy condition versus a powdery condition which can be easily applied to the surfaces of the plastic cards. The problem of control to obtain a coating of anti-friction material upon each card surface therefore becomes significant. The combination of temperature and humidity can effect the adherence of the powder to the surfaces of the plastic card, causing the card to not have enough anti-friction material to be less than a to-be-required amount or to be greater than a to-be-required amount. If the amount is less than a required level, the anti-friction condition, as measured by a test measure, is inadequate. If the amount is greater than a required level, anti-friction condition of the plastic card is excessive as measured by a test measure and the card needs to be reprocessed.

De-ionized air, applied as a blast of air, instead of a powder, can be used to control generation of static electricity upon plastic cards but the effect in controlling the generation of static electricity is not as permanent as use of a powder.

The process and apparatus for preparation of a no-jam vending machine plastic card accordingly comprises a dusting machine which applies a controlled amount of powder to a series of plastic cards which pass through the dusting machine and a test unit which measures the amount of anti-friction powder applied to each card during passage through the dusting machine. The dusting machine comprises two chambers that are separate and closed to each other. In a first chamber, the anti-friction material is applied to each card, one-by-one. In the second chamber, excess anti-friction material is removed to provide a suitable vending machine plastic card. The product of the second chamber is tested in a test unit to verify that the no-jam vending machine plastic card has the no-jam characteristics required for use in a vending machine.

In the prior art, a number of patents teach devices and methods of application for coating powder upon objects and dispensing objects wherein problems of application and utility in vending machines and of coating powder are disclosed.

U.S. Pat. No. 6,510,788 to Norheim discloses a device for application of coating powder in a screen or offset printing process wherein an adhesive powder is applied to a printed material that can be heat transferred to a garment. In Christmas cards, a printed area is often coated with different powders, the excess powder being removed. The device utilizes a conveyor with an air permeable conveyor surface for conveying a base sheet in a direction of travel, the base sheet being coated with a coating powder upstream of the conveyor. The powder-applying device includes a vibrating hopper. An air jet used as an air-knife removes excess powder from the base sheet. A suction device beneath the conveyor forces the excess coating powder to pass through the conveyor surface. U.S. Pat. No. 6,497,371 to Kayanakis teaches use of silvery powder as a protective coating as a component of an electronic module comprising an integrated circuit and an antenna, the antenna formed of the silvery powder. U.S. Pat. No. 6,425,344 to Strahm discloses a device for coating a web-like sheet formation wherein a thermoplastic powder is scattered over a surface, the powder is thermally treated, and an air jet swirls up the powder and a suction means removes the swirled up powder. U.S. Pat. No. 6,267,370 to Ito, et al., discloses a mechanical card dispensing device for an automatic card vending machine whereby the device has a mechanism for preventing double feeding of cards so as to dispense the cards one-by-one. The double feed preventing mechanism utilizes rollers which feed the dispensing cards from a card feed route to the double feed preventing mechanism. U.S. Pat. No. 6,231,042 to Ito, et al., discloses a card dispensing device which has a mechanism for forcibly modifying the altitude of an inclining slide for a card dispensing device of an automatic card vending machine. The altitude of the slide is modified from a horizontal level in which a vending machine card is being pushed forward to an inclined altitude to dispense the card and then the slide is forcibly returned to its initial horizontal altitude. U.S. Pat. No. 6,199,757, to Kubert, discloses a method of removing a vending machine card from a stack of vending machine cards by friction between the card and stripper belts through a pre-shingler and through a series of stripper fingers which guide the card into a card feed discharge assembly. U.S. Pat. No. 5,654,050, to Whalen-Shaw, discloses a playing card of paper which is laminated with plastic films on both sides. The films are mechanically embossed with embossments that provide a static slip in the range of from about 7° to 15°. The amount of static slip avoids having one card stick with respect to another. Static slip is taught as being measured by placing a pair of cards on an adjustable incline and determining the angle at which one card slips with respect to the other, the static slip being measured in degrees. The embossments are spherical indentations made in the surface of the films in the nip of a roll machine. Each indentation had a depth of about 20 microns. The frequency of the indentations was 344 per square centimeter. The cards were embossed after lamination with plastic films. Samples of the embossed, laminated cards were measured also for gloss. Reported static slips of the cards were in terms of average slip degrees and statistical deviation. A slip in the range of about 7° to 15° is considered acceptable. U.S. Pat. No. 4,873,937 to Binder, et al., discloses a method and apparatus for spraying a particulate powder material into a continuous roving or tow formed of individual strands. The apparatus comprises a hollow spraying chamber having inlet and outlet guides for receiving the tow moving axially therethrough. A stream of air-entrained particulate powder is injected into the hollow spraying chamber, at an angle relative to the direction of movement of the tow. The air velocity is such that the individual strands of the tow are separated from one another and the particulate powder material is lodged between the exterior surfaces of adjacent strands throughout substantially the entire thickness of the tow.

Although aspects and elements of the current invention are taught in the prior art, i.e., the use of a conveyor in conjunction with a powder applying device including a vibrating hopper, an air-knife to remove excess powder and a suction device to remove excess powder; the use of a powder as a protective coating; the use of an air jet to swirl up an applied powder and a suction means to remove the applied powder; a mechanical card dispensing device wherein the device has a mechanism for preventing double feeding of cards versus a one-by-one feeding from a card dispensing machine; the method of removing a vending machine card from a stack of vending machine cards by use of friction belts and stripper fingers into a card discharge assembly; and a card with embossments to provide static slip, the static slip being measured by slip of cards upon an adjustable incline, the angle of slip in degrees indicating slip; the instant invented process and apparatus for preparation for a no-jam vending machine plastic card has not been disclosed in the prior art. Additional elements of the invented process include a test procedure of a multiple number of random samples of up to 100% testing of the vending machine plastic cards to insure no card will fail ejection from the vending machine, the process and apparatus providing cards that are treated before placement in a vending machine to provide the necessary slip factor without the need of additional devices within the vending machine. The treated cards can be used in conventionally available vending machines of conventional design. The plastic cards after the treatment process are suitable for use in vending machines under conditions of increased humidity and temperature found in off shore locations such as ocean-going vessels operating all over the world and in locations of high heat and humidity conditions.

SUMMARY OF THE INVENTION

This invention relates to a process and apparatus for application and testing of a coating powder onto vending machine plastic cards for preparation of no-jam vending machine plastic cards. The process comprises application of dusting powder to plastic cards to be later vended from a vending machine, removal of excess dusting powder from the dusted cards, and testing of the dusted cards to eliminate plastic cards that lack no-jam capacity. The process utilizes two apparatus, one, a process dusting unit, and, two, a test unit to measure the no-jam capability of each plastic card tested. The operation of the dusting machine is to pre-coat individual cards with an anti-static powder in an amount which will allow the card to be dispensed from a vending machine without stopping in the machine's exit or without multiple layering of cards due to static charges upon the plastic cards. The operation of the test unit measures the efficacy of the residual powder coating upon the plastic cards after treatment by the dusting machine to eliminate plastic cards with excess or insufficient residual powder.

Endless conveyor belt 5 is driven by a separate drive unit comprising electric motor 11 controlled by a variable speed control (not shown) on exterior wall of chamber 1. Speed of the endless conveyor belt is within the range of from 0 to 10 feet per minute. Dwell time within each chamber is within the range of from about 10 to 55 seconds in each chamber.

Figure 3:
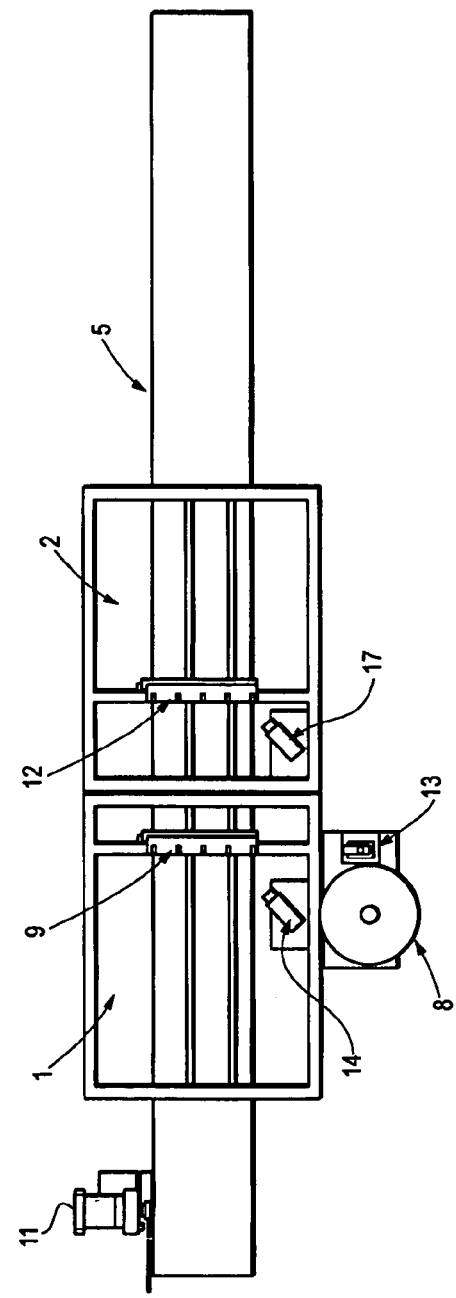
FIG. 3 is a top view of an embodiment of the process dusting unit of FIG. 1.

Trigger switch 14 shown in FIG. 3 activated by passage of passage of sleeves of cards passing into chamber 1 initiates application of dusting powder to cards held in sleeves on belt 5 by activation and deactivation of air knife 9.

As the conveyor belt 5 conveying a sleeve of cards passes through exit aperture of chamber 1 engaging member 15 of the sidewall, acting as a door, member 15 opens and unseals dusting chamber 1 from dust removal chamber 2. Trigger switch 17 shown in FIG. 3 is activated by said sleeve of cards in chamber 2 to initiate application of an air stream to remove excess powder from the powder dusted cards held in said sleeve of cards by air knife 12. Passage of said sleeve activates and deactivates said air knife 12.

Air knife 12 is located over the cards so that air knife 12 separates the cards to be cleaned one at a time.

As the card sleeves pass into chamber 1 and into chamber 2 and pass out of chamber 2, the passage between each chamber is shut before and after each batch by engaging members of the side walls 7, 15 and 16. The engaging members of the sidewall can comprise brush-like structures which permit passage of said card sleeves and cards but provide restricted entry and exit through entry and exit apertures, without significant resistance to passage. Lids 40 and 41 over chambers 1 and 2 respectively provide closure of said chambers during operation.

Figure 5:
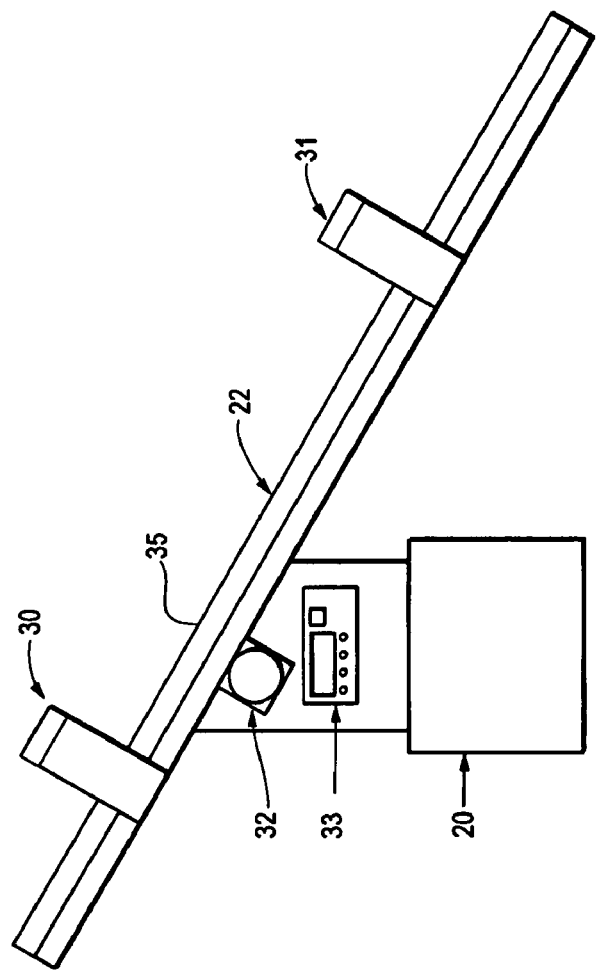
FIG. 5 is a side view of an embodiment of the test unit according to the present Referring now to FIGS. 1, 2, and 3, the dusting machine 10 comprises two separate chambers, chamber 1 and chamber 2. Chamber 1 is the dusting chamber. Chamber 2 is the dust removal chamber. Endless conveyor belt 5 acts as a transport system running through both chambers. The two separate chambers are closed one from the other by engaging members 7, 15, and 16 of the sidewalls of each chamber. Input trays (not shown) which hold sleeves of cards to be dusted are placed upon conveyor belt 5 to travel into and out of dusting chamber 1 through aperture sealed by engaging member 7, which serves to seal the chamber 1 before and after passage of the card sleeves. Hold down guides 6 parallel to and located over conveyor belt 5 at a suitable space over belt 5 hold cards in position in the sleeve (not shown) on belt 5 as the cards pass through dusting chamber 1 and chamber 2. Powder reservoir 8 supplies dusting powder to an air-powder mix venturi tube 13 shown in FIG. 2 and FIG. 3 for application of an air-powder mix to air-knife 9 located operationally above conveyor belt 5, air knife 9 to apply dusting powder to the individual cards. The air-knife 9 separates the cards as the cards pass under the knife 9 to powder the cards.
Figure 4:
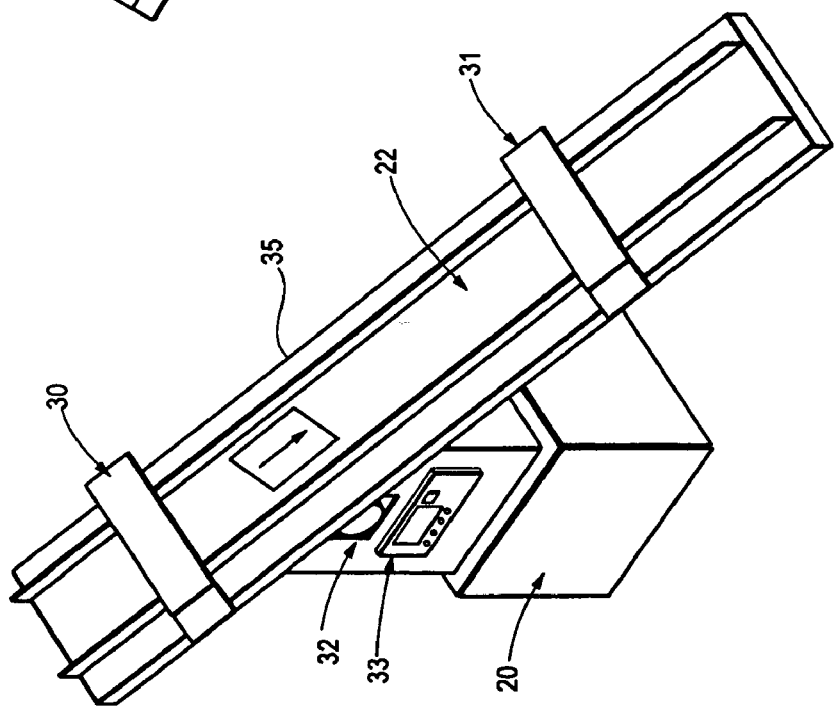
FIG. 4 is a perspective view of an embodiment of the test unit according to the present invention.

Referring now to FIGS. 4 and 5, the test machine 35 shown is a static electric/drag co-efficiency test slide 22 of a preferred embodiment of the instant invention.

FIG. 4 illustrates the proximity switches, the angle indicator 32, the mil/sec counter 33, the slide 22, and support base 20.

In further detail, the two proximity switches 30 and 31 are located a suitable space apart from each other, center to center to permit a time travel measurement between the two switches. In a preferred embodiment, base support 20 and steel slide 22 have two ⅝ inch holes 20 inches apart which are in line with each other, center to center. Base support 20 under each hole has an electric eye (not shown) which projects a light beam to a mirror receiver (not shown) located above steel slide 22, located 4 inches above surface of steel slide 22. Angle indicator 32 indicates the angle of steel slide 22 with a downward pitch within the range of from about 25° to about 35°. Measurement of the card time fall in mil-seconds is displayed on the mil-second counter display 33.

DETAILS OF THE INVENTION

The invention relates to treatment of plastic cards such as telephone cards, or similar comparatively thin prepaid cards such as debit cards, which have become commonplace in areas wherein the purchaser does not need to establish an account with the service provider because the purchase price of the debit card covers the service provider's charge. The proper operation of the vending machine in delivering the debit card after the purchaser has inserted the necessary money charge is accordingly necessary. However, delivery of the debit card to the purchaser by the vending machine can encounter problems. The cards may form multiple layers due to static charge and block exit from the machine or the developed static charge upon the cards from movement within the vending machine may cause other problems in the debit card delivery.

The instant process has been developed to treat the plastic surfaced cards by pre-coating the cards after manufacture of the cards by the card manufacturer and before placement of the cards in a vending machine. The dusting process accordingly is part of the manufacturing process to prepare a card suitable for use in a vending machine. The dusting process eliminates the static charge which can build up in a vending machine as the vending machine dispenses debit cards from the vending machine. Each card is protected from static charge buildup by the presence upon each card of the residual powder coating applied during the dusting of the cards by the dusting machine.

The dusting machine comprises two separate chambers that are closed, one from the other, with an endless conveyor belt transport system running through both chambers. An air knife in the first chamber mixes air and dusting powder from a powder source and applies a mixture of air and powder into the sleeve of cards as each sleeve of cards passes under the air knife.

The individual cards of each sleeve of cards are coated by the dusting powder as each sleeve container of cards travels down the conveyor length and the air knife blows the mixture of air and powder into the sleeve of cards in the first chamber.

The ratio of air pressure in pounds to powder content in ounces of the air powder stream is from 70% to 97% wherein pressure is from 40 lbs (psi) to 97 lbs (psi) and powder content in ounces of powder applied as measured in ounces wherein recycle powder added to the powder reservoir is less than 1% in ounces to said air pressure in pounds (psi).

Transit speed and dwell time of the endless conveyor belt within each chamber are controlled within previously determined limits to cause the placement of a powder layer upon each card that adheres to each card as a residual powder layer.

In the second chamber, a second air knife blows a stream of air without a powder mixture into each sleeve of cards to dislodge and remove excess powder dusting from the required residual powder layer on each card from each sleeve of cards.

Each chamber is separated from the other chamber by a door through which the belt passes. Accordingly, each sleeve of cards is treated in a powder dusting step and in a powder removal step wherein each treatment of a sleeve of cards is by batch operation although continuous operation can be obtained. The door between the two chambers opens and closes in accordance with the required transit speed and dwell times of each sleeve of cards within the separate chambers to provide the proper treatment in the separate operational steps of the dusting process.

Each sleeve of cards as it exits from the second chamber through the exit door of the second chamber is thereupon loaded by manual means onto the static/drag test slide which checks the speed and friction of each card as the card travels down the length of the test slide.

The individual cards tested are statistically randomly selected from each sleeve of cards. The time of slide of each card tested is measured in milliseconds over a preset length of slide. The time of slide of each card is required to be within a given range to designate an acceptable card. In a preferred embodiment, if the time is under 30 milliseconds, the card has an excessive residual powder layer and the card must be cleaned and re-dusted. Similarly, if the time of slide is over 70 milliseconds, the card does not have an adequate residual powder layer and will cause the card to generate a static charge and thereby cause the card to hang up and to jam the vending delivery action of the vending machine.

In a preferred embodiment, the static electricity/drag co-efficiency test slide unit comprises a planar strip of steel supported mid-slide vertically to provide a downward pitch within the range of from 25° to about 35°, preferably about a 30° slope downward from the horizontal. The length of the slide planar strip is sufficient to provide a travel distance for the test card to generate a time measure of the slope distance traveled by a test card down the slope of the planar strip of steel. Two electric eyes set at prescribed distance apart are used to measure the passage time of the tested card.

DESCRIPTION OF A PREFERRED
EMBODIMENT OF THE INVENTION

Figure 1:
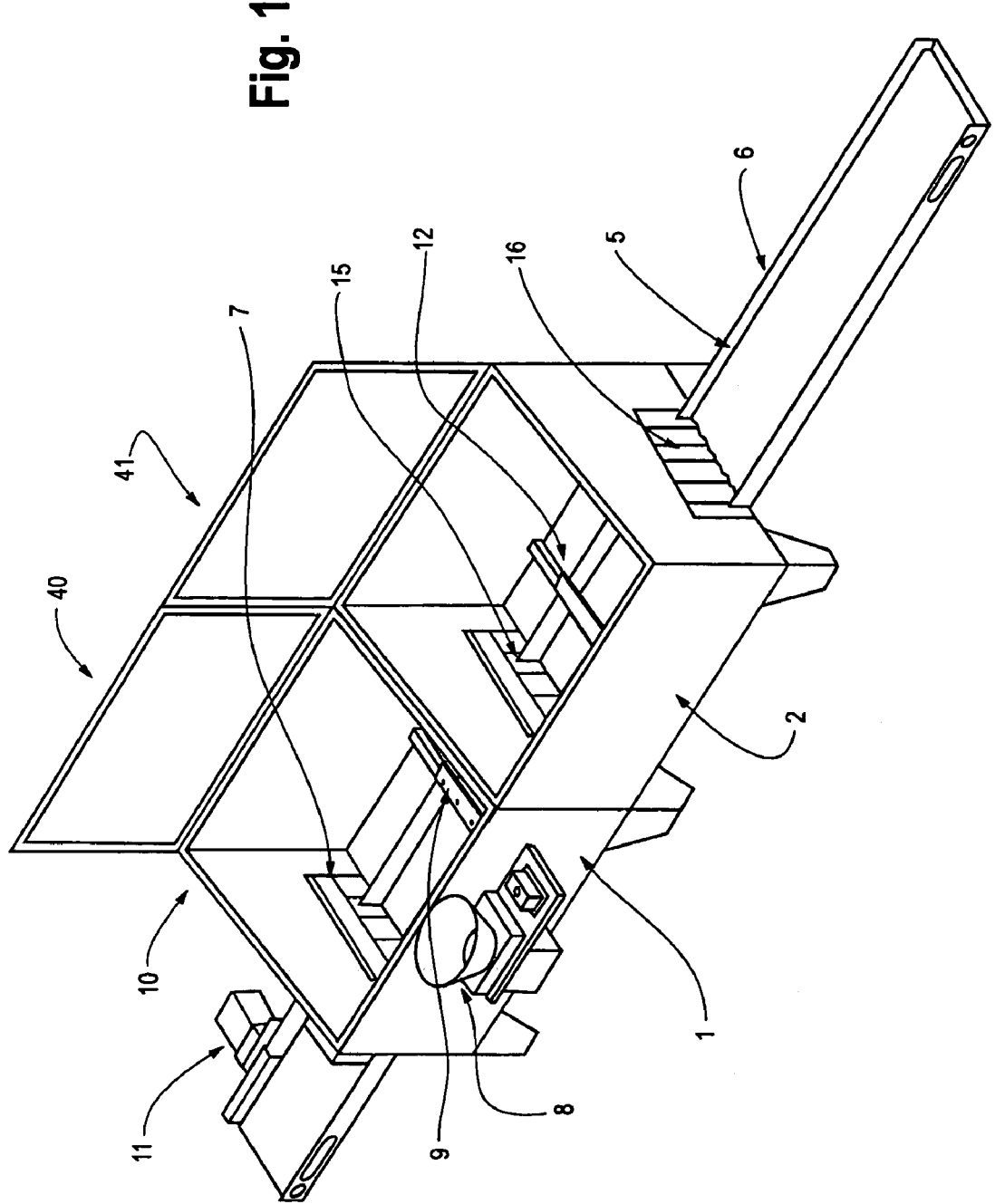
FIG. 1 is a perspective view of an embodiment of the process dusting unit according to the present invention.
Figure 2:
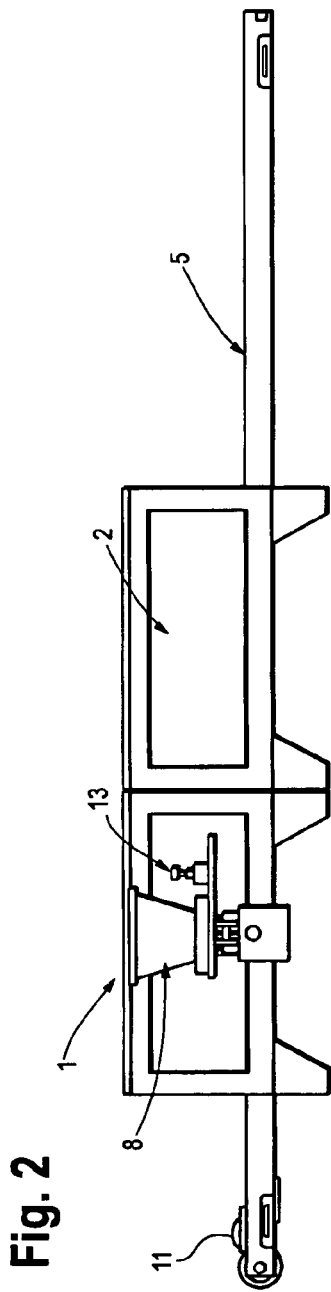
FIG. 2 is a side view of an embodiment of the process dusting unit of FIG. 1.

The machine shown in FIGS. 1, 2 and 3 as the dusting machine of a preferred embodiment of the invention comprises two separate chambers that are closed one from the other with an endless conveyor belt transport system running through both chambers as shown in the figure. The two chambers are respectively a dusting chamber and a dust removal chamber. Input trays which hold the sleeves of cards placed upon the conveyor belt travel into dusting chamber 1 through an aperture with an engaging member of the sidewall of chamber 1 which serves to seal the chamber before and after passage of the card sleeves. The hold-down guides parallel to and located over the conveyor belt at a suitable space over the belt hold cards in position in the sleeve on the conveyor belt as the cards pass through dusting chamber. An air knife is located above and across the cards in position on the conveyor belt, the said cards held in position by said hold-down guides above the conveyor belt. A powder reservoir bowl supported on an exterior wall of the dusting chamber receives dusting powder and feeds the dusting powder to an air-powder mixer unit for said air-knife located operationally adjacent.

The endless conveyor belt transport system is driven by a separate drive unit (not shown) comprising an electric motor. The separate drive unit is controlled by a variable speed control located on an exterior side wall of the dusting chamber.

As the endless conveyor belt passes through an exit aperture on the opposite side wall of the dusting chamber, a second engaging member of the opposite sidewall, acting as a door, unseals the dusting chamber from the dust removal chamber.

In the dust removal chamber, the dusted cards in the endless conveyor belt pass under an air knife located above and across the cards held in position on the conveyor belt by said hold down guides. Excess powder is removed from the cards by the air knife, the air knife being triggered by a trigger switch activated by passage of the sleeve of cards into the dust removal chamber. The excess powder collected in the dust removal chamber collects in a powder reservoir (not shown) located in the base of the dust removal chamber. The engaging members of the sidewalls of the dusting chamber and the dust removal chamber which act as sealing doors between the two chambers are activated to open and close by passage of the sleeves containing cards to be treated. As the card sleeves travel from one chamber to the other, the passage between each chamber is shut before and after each batch to prevent contamination.

Recovered powder in the powder reservoir is removed from the powder reservoir by an air line (not shown) and transported to the air-knife of said dusting chamber.

The machine shown in FIGS. 4 and 5 as the static electricity/drag co-efficiency test slide of a preferred embodiment of the invention comprises a test unit that can test all types of cards of PVC, styrene, paper laminated phone cards, casino cards and UV coated cards. The cards and the metal test slide can be measured for static charge with a commercially available electrostatic locator, such as an electrostatic locator ACL model No. 300B. The electrostatic locator can measure the amount of static charge in volts on the cards and the metal test slide if such is desired.

In operation, the test card slides down the metal slide past two electric eyes that measure the time span between designated points. The time span is optionally recorded upon a recorder screen for reference and data collation. Optionally, the time of passage of a test card passing between the two electric eyes is measured and recorded by an electrically computer operated recording means in milli-seconds.

The movement of the cards as the cards traverse the length of the slide also creates a static charge on the cards which can be measured. Measurements of static charges on the cards of over 200 volts can indicate possible problems of unacceptable static charges, and hence potentially unacceptable cards for use in vending machines. Although the measurement of the static charge with an electrostatic locator can provide a measure of the static charge present, without reproduction of conditions present in a vending machine, i.e., the fall and drop of a card in a vending machine dispensing unit, guidelines as to range of acceptable levels of static charges on the cards used in a vending machine dispensing unit are not typically available to determine the range of acceptable levels of static charges.

The static electricity/drag co-efficiency test slide of the instant invention accordingly replicates the fall and drop of a card in a vending machine and provides a measurement of the card's reaction in a controlled environment relative to the weight of the card, the surface energy developed on the card, the static charge developed of the material and by the vending process. The test slide unit of the instant invention provides a control measurement of the application of the residual powder layer on each card tested. In a preferred embodiment, the measurement of the card time fall range of between 30 and 70 mili-seconds has been determined as indicating the level of the residual powder layer. If the fall time level is under 30 mili-seconds, the card has excess residual powder layer and must be cleaned and re-dusted. If the time fall range is 70 or over mili-seconds, the card does not have an adequate residual powder layer and the card is to be re-coated to pass the fall test.

An essential element of the instant invention is the dusting powder applied to the cards to provide the residual powder layer. The significant properties of the powder used include the particle size of the powder, 25 microns to 35 microns, the physical composition, coated cornstarch, and chemical analysis, silicone encapsulated cornstarch, of the powder, inherent moisture content 0%, moisture absorption, 0% to 2%, and adsorption 0%. A suitable powder has been found to be Varn Set Off Powder No. C-270, manufactured by Varn Mfg. Co., New York, N.Y. Characteristics of Varn Set-Off Powder No. C-270 are as follows: white in color, fine grain/25 micron, non-absorbent.

It is essential that the powder layer adhere to the vended card and not be dislodged from the card during the vending machine operation to form an air dust layer within the vending machine with possible adherence to vending machine operational parts and clogging of the machine parts with extraneous powder. The powder layer should adhere to the vended card and not be dislodged in use by the card user with possible adherence to the card user or to the card user's articles.

The following illustrates the process, construction and application of the instant invention in a preferred embodiment comprising, in combination, the dusting machine component and the static/drag co-efficiency test slide component.

The dusting machine component, as described above, is comprised of two separate chambers, each closed from the other, with a conveyor belt transport system running through the two chambers. An air knife in the first chamber delivers a mixture of air and powder into the cards held in the card sleeve as the cards travel down the conveyor belt space. As the cards enter the second chamber, a second air knife blows only air into the sleeve of cards to blow out excess powder. The sleeve of cards exits the second chamber to be tested in the static/drag co-efficiency test slide.

The conveyor belt of the dusting machine has a variable speed control to control dwell time in the chamber. The range of dwell time is from 10 seconds to about 30 seconds wherein the powder applied is Varn Set Off No. C-270 manufactured by Varn Mfg. Co., New York, N.Y. The range of dwell time can vary with the characteristics of the powder applied, the dwell time being determined by test.

The width of the conveyor belt can range from seven inches up to and including twenty inches for sleeves of cards that measure three and one-half inches in width. Sleeves containing 500 individual cards or more in multiple sets can therefore be treated and dusted. Guide retainers on each side of said retainer belt serve to keep the sleeves of cards on the conveyor belt in position and within the belt area to be treated with the dusting procedure.

The first chamber has an entry door which seals after the cards have entered the chamber. The card sleeve activates a trigger switch as the card sleeve moves on the conveyor belt. The trigger switch activates an air knife to spray a mixture of air and powder into each sleeve of cards, the air and powder mixture being sprayed onto each card as it passes under the air knife. The air powder mixture is supplied by an air line from the powder reservoir located on the outer side of the first chamber. The air line has a venturi tube inset in the air line which serves to suction the powder from the powder reservoir in a suitable ratio to blend air and powder for application of the powder to coat each card with powder. The card sleeve exits from the first chamber by an exit door which seals after the card sleeve enters into the second chamber by means of the conveyor belt. As the card sleeve enters the second chamber, the card sleeve activates a trigger switch that activates an air knife to spray air into each sleeve of cards to blow out excess powder from each sleeve of cards and from each card. As each card sleeve travels from one chamber into the other, the door between each chamber is shut to prevent contamination.

The ratio of air to powder content ranges from 70% to 97% in the first air knife and the air pressure is about 90 lbs/sq. in. Both the first and second air knives operate, in conjunction with the powder characteristics, to cause a convenient application of a residual powder layer of a suitable amount of powder to meet the requirements of the static/drag co-efficiency test slide.

The static electricity/drag co-efficiency test slide component, as described above, is suitably supported on a base with an upright member of suitable height to provide a metal slide of thirty three inches from top of the slide to base of the slide at an angle of 30°.

The details of a prototype as an example are that the test unit is on a 33 inch base structure with a height of 18 inches on the 90° angle side which goes down to the foot of the base structure to make a 30° angle downward pitch to the slide. The length of the full slide is 33 inches from the top of the base for the slide to the base structure for the slide. The metal slide support is a metal sheet with a formed lip at one end of the sheet which hooks onto the top of the base structure. The metal sheet slide support is 6 inches wide. The metal sheet slide support fits against two centering pins on the support member of the base structure. The test slide is a steel sheet of 3⅜ inches slide width with upturned sides to retain the test cards in position. The test slide is supported by the metal support member of the base structure. ¾ inch holes 20 inches apart which are in line with each other, center to center. The base support under each hole has an electric eye that projects a beam to a mirror (receiver) located above the steel slide, 4 inches above the surface of the steel slide. Time of passage between the two electric eyes of a card traveling down the steel slide is detected and recorded in mili-seconds on an electrically computer operated recording meter mounted on the base support; the two electric eyes being electrically connected so that as the card being tested passes the first eye and then the second eye, the time of passage is measured in mili-seconds and recorded on the recording meter, with a suitable display and means of recording. The time is relative to the weight and surface of the card as indicating the co-efficiency of the weight and material surface of the card and reflecting the static charge and drag of the card.

A reset button on the support structure clears the time recorder after each test.

In operation, the test card is placed at the top of the slide and is allowed to drop, as in a vending machine, from one to two inches and thereupon the card travels past the two electric eyes and the time is recorded. The cards fall within a given time range to be classed as acceptable. As previously determined, that range, with application of the stated powder, Varn Set Off No. C-270/fine micron powder, is between 30 and 70 mili-seconds.

If the speed is under 30 mili-seconds, the card has too much of a residual powder coating and must be cleaned and re-dusted. If the speed is over 70 mili-seconds, the card does not have enough residual powder coating; the card will cause cards to hang up and generate a static electricity charge; the card will need to be re-coated to pass the slide test.

As noted earlier, the test cards of each card sleeve are randomly tested by selecting cards at random from the beginning, middle and end of a card sleeve. The cards after test are returned to the card sleeve and passage time recorded in a log book with job name, number, and count of cards tested. Alternatively, the cards of each sleeve can be 100% tested by individually testing each card.

To insure elimination of cards causing vending machine failure, all cards selected randomly from a card sleeve are required to have test slide time within the range of from 30 to 70 mili-seconds.

What is claimed is:

1. A process and apparatus for preparation of no-jam vending machine cards wherein said process and apparatus comprise, in combination,
   a. a dusting powder machine composed of two separate chambers, each chamber closed one from the other with an endless conveyor belt running through both chambers at a predetermined transit speed and dwell time, a first chamber comprising a dusting powder application chamber for a dusting powder, wherein said dusting powder is applied to said cards by an air-powder stream, a second chamber comprising a dusting powder removal chamber,
   b. a static electricity/drag co-efficiency test slide unit wherein said unit comprises a card test slide equipped with at least two electric eyes to measure slide passage time and a recording means to record passage time of a test card passage between said electric eyes, and
   c. said process comprises dusting said vending machine cards with a suitable powder to provide a residual powder layer on said vending machine cards by means of an air-powder stream of said dusting machine to provide a residual powder layer on said cards and testing said vending machine cards having said residual powder layer by means of said static electricity/drag co-efficiency test slide unit wherein said cards meet a slide test time range indicating acceptable residual powder layer on each card tested as a sufficient residual powder layer as means of measuring static electricity/card drag co-efficiency and efficacy of application of said residual powder layer as said static electricity/card drag co-efficiency.

2. The process and apparatus of claim 1 wherein characteristics of said suitable powder include the ability of the powder to adhere to the surface of said cards upon application of a stream of said powder in an air stream to form a residual powder layer upon surface of said cards.

3. The process and apparatus of claim 1 wherein characteristics of said suitable powder comprise a powder particle size within the range of 25 microns to 35 microns, moisture content is in the range of from 0% to 2%, and chemical analysis is silicone encapsulated cornstarch.

4. The process and apparatus of claim 1 wherein said suitable powder characteristics are: particle size 25 microns, physical composition: coated cornstarch, chemical analysis: silicone uncapsulated cornstarch, moisture content 0%, moisture absorption 0%, moisture adsorption 0%.

5. The process and apparatus of claim 1 wherein transit speed of said endless conveyor belt running through said two chambers is within the range of from 0 to about 10 feet per minute.

6. The process and apparatus of claim 1 wherein dwell time of said endless conveyor belt within each chamber is within the range of from 10 to 55 seconds in each chamber.

7. The process and apparatus of claim 1 wherein ratio of air pressure in powder to powder content in ounces of said air powder stream is from 70% to 97% wherein air pressure is in the range of from 40 lb (psi) to 97 lb (psi) and powder content is in ounces of powder applied as measured in ounces wherein recycle powder added to said powder reservoir per hour is less then 1% in ounces to said air pressure in pounds (psi).

8. The process and apparatus of claim 1 wherein said test slide has a downward pitch of within the range of from about 25° to about 35°.

9. The process and apparatus of claim 1 wherein said test slide has a downward pitch of about 30°.

10. The process and apparatus of claim 1 wherein time of passage of a test card passing between said two electric eyes is measured and recorded by an electrically computer operated recording means in mili-seconds suitably displayed and recorded.

11. The process and apparatus of claim 1 wherein time of passage of a test card passing between two said electric eyes on said test slide is within the range of from 30 to 70 mili-seconds.

* * * * *